(12) United States Patent
Cavalieri et al.

(10) Patent No.: US 8,063,160 B2
(45) Date of Patent: Nov. 22, 2011

(54) PROPYLENE-ETHYLENE COPOLYMERS AND PROCESS FOR THEIR PREPARATION

(75) Inventors: Claudio Cavalieri, Ferrara (IT); Roberto Pantaleoni, Ferrara (IT); Hiroshi Fujiishi, Kawasaki (JP); Akihiro Otsubo, Kawasaki (JP)

(73) Assignee: Basell Poliolefine Italia, s.r.l., Milan (IT)

( * ) Notice: Subject to any disclaimer, the term of this patent is extended or adjusted under 35 U.S.C. 154(b) by 246 days.

(21) Appl. No.: 11/920,311

(22) PCT Filed: May 9, 2006

(86) PCT No.: PCT/EP2006/062152
§ 371 (c)(1),
(2), (4) Date: Nov. 13, 2007

(87) PCT Pub. No.: WO2006/120190
PCT Pub. Date: Nov. 16, 2006

(65) Prior Publication Data
US 2011/0098423 A1     Apr. 28, 2011

Related U.S. Application Data

(60) Provisional application No. 60/682,353, filed on May 18, 2005.

(30) Foreign Application Priority Data
May 12, 2005   (EP) .................... 05103964

(51) Int. Cl.
C08F 2/00      (2006.01)
C08F 210/00    (2006.01)
C08F 110/06    (2006.01)
B01J 37/00     (2006.01)

(52) U.S. Cl. ......... 526/209; 526/348; 526/351; 502/126
(58) Field of Classification Search ............... 524/124.3; 526/209, 351; 502/126
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 4,634,740 A | 1/1987 | Fujita et al. | |
| 4,916,198 A | 4/1990 | Scheve et al. | |
| 5,047,485 A | 9/1991 | DeNicola, Jr. | |
| 5,234,879 A | 8/1993 | Garoff et al. | |
| 5,338,764 A | 8/1994 | Lesca et al. | |
| 5,362,782 A | 11/1994 | McCullough, Jr. et al. | |
| 5,587,436 A | 12/1996 | Klimek et al. | |
| 6,022,628 A | 2/2000 | Chatterjee et al. | |
| 6,057,413 A * | 5/2000 | Ima et al. .................. | 526/348 |
| 6,303,709 B1 | 10/2001 | Jauniaux | |
| 6,693,161 B2 | 2/2004 | Collina et al. | |
| 6,716,921 B1 | 4/2004 | Nakashima et al. | |
| 6,800,710 B2 | 10/2004 | Pelliconi et al. | |
| 7,294,681 B2 | 11/2007 | Jiang et al. | |
| 7,381,773 B2 | 6/2008 | Pelliconi et al. | |
| 7,390,575 B2 | 6/2008 | Tayano et al. | |
| 2008/0064836 A1 * | 3/2008 | Ferraro et al. .............. | 526/124.3 |
| 2008/0090982 A1 | 4/2008 | Cagnani et al. | |
| 2009/0030098 A1 | 1/2009 | Cagnani et al. | |

FOREIGN PATENT DOCUMENTS

| | | |
|---|---|---|
| EP | 45977 | 2/1982 |
| EP | 0341724 | 11/1989 |
| EP | 361494 | 4/1990 |
| EP | 395083 | 10/1990 |
| EP | 553805 | 8/1993 |
| EP | 553806 | 8/1993 |
| EP | 560035 | 9/1993 |
| EP | 573862 | 12/1993 |
| EP | 601525 | 6/1994 |
| EP | 634441 | 1/1995 |
| EP | 0728769 | 8/1996 |
| EP | 728769 | 8/1996 |
| EP | 728769 A1 * | 8/1996 |
| EP | 757069 | 2/1997 |
| EP | 782587 | 7/1997 |
| EP | 942013 | 9/1999 |
| EP | 1026198 | 8/2000 |
| EP | 1038893 | 9/2000 |
| EP | 1242483 | 9/2002 |
| EP | 1272533 | 1/2003 |
| EP | 1428853 | 6/2004 |
| EP | 1448622 | 8/2004 |
| EP | 1674530 | 6/2006 |
| WO | WO97/31954 | 9/1997 |
| WO | 98/44009 | 10/1998 |
| WO | 99/16797 | 4/1999 |
| WO | 99/36466 | 7/1999 |
| WO | 00/02929 | 1/2000 |
| WO | 00/63261 | 10/2000 |
| WO | 01/92406 | 12/2001 |
| WO | 02/30998 | 4/2002 |
| WO | WO03/002625 | 1/2003 |
| WO | 03/082971 | 10/2003 |
| WO | 2005/113622 | 12/2005 |
| WO | WO2005/113622 | 12/2005 |
| WO | WO 2005/113622 * | 12/2005 |
| WO | 2006/082144 | 8/2006 |
| WO | 2006/114357 | 11/2006 |
| WO | 2007/003523 | 1/2007 |

* cited by examiner

OTHER PUBLICATIONS

Polypropylene Handbook, EP Moore, Hanser Publishers Munich, 1996, pp. 56-58; 244-246; and 404-406.

*Primary Examiner* — David W Wu
*Assistant Examiner* — Elizabeth Eng
(74) *Attorney, Agent, or Firm* — Dilworth IP, LLC

(57) ABSTRACT

Random propylene/ethylene copolymers are provided characterized by
  Ethylene content in the range of 4.5-7% wt;
  Mw/Mn (via GPC) in the range 3.5-5.5;
  Mz/Mw (via GPC) lower than 4;
  absence of 2-1 regioinversion, and
  Melting Temperature (Tm) (non-nucleated grade) lower than 143° C.
The said copolymers show an excellent balance of impact and optical properties which is retained even after visbreaking.

10 Claims, 1 Drawing Sheet

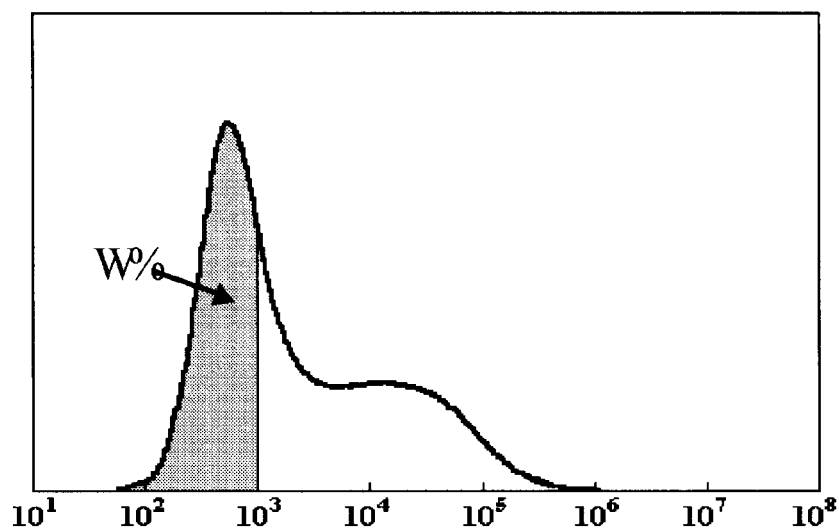
Figure 1 Molecular weight distribution of xylene soluble fraction.

PROPYLENE-ETHYLENE COPOLYMERS AND PROCESS FOR THEIR PREPARATION

This application is the U.S. national phase of International Application PCT/EP2006/062152, filed May 9, 2006, claiming priority to European Patent Application 05103964.2 filed May 12, 2005, and the benefit under 35 U.S.C. 119(e) of U.S. Provisional Application No. 60/682,353, filed May 18, 2005; the disclosures of International Application PCT/EP2006/062152, European Patent Application 05103964.2 and U.S. Provisional Application No. 60/682,353, each as filed, are incorporated herein by reference.

The present invention relates to propylene-ethylene copolymers and to a specific process for their preparation carried out in suspension. In particular, the present invention provides propylene-ethylene random copolymers characterized by a specific set of properties and showing excellent balance of mechanical and optical properties. It is very well known in the art that isotactic polypropylene is endowed with an exceptional combination of excellent properties which render it suitable for a very great number of uses; however, it exhibits the drawback of possessing an unsufficient impact strength due to its too high rigidity. Attempts were made to obviate such drawback, either by properly modifying the synthesis process or by blending it with rubbers.

The modifications to the synthesis process essentially consist in introducing into the propylene stereoregular homopolymerization process one or more copolymerization steps. In particular, it is known that for certain applications it is useful to decrease the crystallinity of the propylene homopolymer by copolymerization of the propylene with small quantities (0.5-4% wt) of comonomers such as ethylene and/or α-olefins such as 1-butene, 1-pentene and 1-hexene. In this manner one obtains the so called random crystalline propylene copolymers which, when compared to the homopolymer, are essentially characterized by better flexibility and transparency.

These materials can be used in many application sectors, such as, for example irrigation pipes, pipes for transporting drinking water and other liquid food, heating equipments, single layer bottles (for detergents), multilayer bottles (for beverages), single layer or multilayer film for various packaging and rigid food containers.

Propylene random copolymers, however, although they have good transparency, do not offer, especially at low temperatures, sufficiently better impact resistance than the homopolymer which can be satisfactory used for the applications listed above.

It has been known for a long time that the impact resistance of polypropylene can be improved by adding an adequate quantity of elastomeric propylene-ethylene copolymer to the homopolymers by mechanical blending or sequential polymerization thereby creating the so-called heterophasic copolymers. This solution, described in many patents such as, U.S. Pat. No. 4,634,740 or WO01/92406 usually leads to a decrease of the transparency of the material. In addition, as the crystalline portion of the heterophasic copolymers causes the melting temperature occurring at relatively high values, the processability of these materials can be negatively affected.

On the other hand, it was recognized that by increasing the ethylene content in the random propylene copolymer of the art an unfavorable balance of properties is obtained as the increase of the xylene soluble fraction is not compensated by a further increase in optical properties, in particular when the polymers are visbroken (via peroxidic degradation) to create lower molecular weight polymers with higher Melt Flow rates. The applicant has now found new propylene random copolymers characterized by a specific set of properties and showing, both in their reactor-grade state and when visbroken at lower molecular weight, an excellent balance of optical, impact and processability properties. These polymers can be obtained by a specific process comprising the use of a specific catalyst component which constitutes another object of the present invention.

BRIEF DESCRIPTION OF THE SEVERAL VIEWS OF THE DRAWING

FIG. 1 illustrates the molecular weight distribution of a xylene soluble fraction.

Accordingly, the propylene-ethylene copolymers of the invention are characterized by Ethylene content determined by IR spectroscopy in the range of 4.5-7% wt;

Mw/Mn (via GPC) in the range 3.5-5.5;

Mz/Mw (via GPC) lower than 4;

absence of 2-1 regioinversion, and

Melting Temperature (Tm) (non-nucleated grade) lower than 143° C.

The above properties are preferably shown in the polymers as reactor grades and in particular before any downstream treatment like nucleation, or peroxidic treatment. Preferably, the ethylene content ranges from 5 to 6.5% wt more preferably from 5 to 6%.

Preferably, the Mw/Mn (measured with method described below) ranges from 3.5 to 5.3 and in particular from 3.5 to 4.5; the Mz/Mw value is preferably lower than 3.8 and more preferably lower than 3.5.

The Melting Temperature (measured via DSC method specifically described below on the non nucleated polymer) is usually in the range 120-140° C., preferably in the range 125-135° C. In a preferred aspect of the present invention the copolymers are characterized by a single melting peak falling in the above-mentioned range. In some cases, the peak has an asymmetric appearance showing a shoulder positioned towards the higher temperature melting point.

Additionally, the copolymers are characterized by intrinsic viscosity [η] in tetraline at 135° C. higher than 1.5, and preferably higher than 1.8.

The Melt Flow Rate can range from 0.01 to 50, preferably from 0.05 to 20 and more preferably from 0.1 to 5; still more preferred are Melt Flow rates in the range 0.1 to 2. The said copolymers are also characterized by very low oligomer content which is usually less than 1% and in particularly when the Mw of the polymer has been reduced with peroxides, less than 0.5% especially lower than 0.4%. According to the present invention the oligomer fraction is considered as the polymer portion soluble in xylene at 25° C., according to the method reported below, having an average molecular weight (Mw) lower than 1000 and determined with the method reported below.

This property largely affects the stickiness behavior of the films obtained from these copolymers and it is evaluated through the blocking index and the coefficient of friction which, in the present invention are particularly low compared to the prior art products. These features confer to the copolymers and products obtained thereof an increased workability that in turn involves improved economics. Moreover, the low content of oligomers also mitigates the blooming effect thereby imparting improved optical properties to the said polymers and the objects thereof. The copolymers of the invention can be used in a variety of applications with good results. In particular, they are well suited for the production of films (both cast and BOPP technology) for packaging, and for the production of injection molded articles characterized by an excellent balance among impact and optical properties. The working examples reported below demonstrate that the copolymers of the invention possess as reactor-grade, an increased softness (lower Flexural Modulus) over the conventional copolymers having the same ethylene content. The increased softness is also apparent on the additivated versions of the same polymers (Table 3). Moreover, as it is evident from tables 2 and 4, the copolymer of the invention, particularly when the MFR has been increased by peroxyde treatment are also characterized by values of Seal Initiation Temperature (SIT) and haze that are surprisingly lower than those commonly associated to the conventional copolymers having the same ethylene content. Such low values of SIT are very important because they allow to reduce the sealing time and the associated needed energy thereby allowing a more efficient process. On the other hand the lower haze and thus the increased transparency greatly improve the appearance of the manufactured articles which is particularly important in the packaging field.

The copolymer of the present invention can be obtained by polymerizing propylene and ethylene in the presence of a stereospecific Z/N catalyst and particularly highly stereospecific Z/N catalyst. In particular, it is preferable to carry out the polymerization using the liquid monomer (propylene) as a diluent. The stereospecific Ziegler-Natta catalysts suitable for producing the propylene polymer compositions of the invention comprise a solid catalyst component comprising at least one titanium compound having at least one titanium-halogen bond and at least an electron-donor compound (internal donor), both supported on magnesium chloride compound. The Ziegler-Natta catalyst systems further comprise an organo-aluminum compound as essential co-catalyst and optionally an external electron-donor compound.

Preferably, the internal electron donor compound is selected from 1,3-diethers and in particular from those of formula (I)

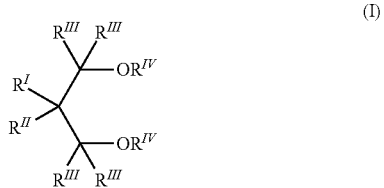

(I)

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1-6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenyl ethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimethoxypropane, 2-cyclohexyl-2-cyclohexylmethyl-1,3-dimethoxypropane.

Furthermore, particularly preferred are the 1,3-diethers of formula (II)

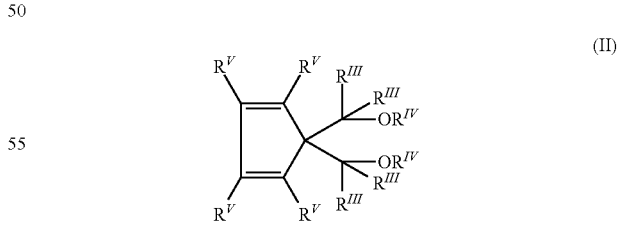

(II)

where the radicals $R^{IV}$ have the same meaning explained above and the radicals $R^{III}$ and $R^{IV}$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals and two or more of the $R^V$ radicals can be bonded to each other to form condensed cyclic structures, saturated or unsaturated, optionally substituted with $R^{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals $R^V$ and $R^{VI}$ optionally containing one or more heteroatoms as substitutes for carbon or hydrogen atoms, or both.

Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Specially preferred are the compounds of formula (III):

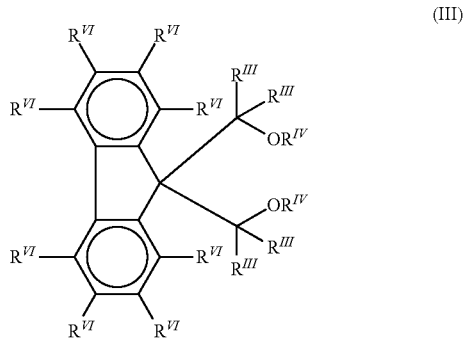

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (II).

Specific examples of compounds comprised in formulae (II) and (III) are:
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;
1,1-bis(methoxymethyl)-7-trimethylsilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopentylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the succinate of formula (I) is used in molar ratio with respect to the $MgCl_2$ of from 0.01 to 1 preferably from 0.05 to 0.5. The preparation of catalyst components in spherical form is described for example in European patent applications EP-A-395083, EP-A-553805, EP-A-553806, EP-A-601525 and WO98/44009. The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10,000 Å generally ranges from 0.3 to 1.5 $cm^3/g$, preferably from 0.45 to 1 $cm^3/g$.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon compounds, of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, dicyclopentyldimethoxysilane. The external electron donor compound is used in such an amount to give a weight ratio between the organo-aluminum compound and said electron donor compound of from 0.1 to 50, preferably in the range 1-10.

As mentioned above, it is preferable to carry out the polymerization process in liquid phase, using the liquid propylene as the main diluent (bulk polymerization). Preferably, the bulk polymerization is carried out in one or more loop reactors which are connected in series. In a particular aspect, said process comprises a first stage in which is carried out a pre-contact of the above-mentioned catalyst components, in the presence of propylene, for a period of time ranging from 0.1 to 120 minutes preferably in the range from 1 to 60 minutes. The pre-contact can be carried out at a temperature ranging from 0 to 50° C. preferably in the range of 5 to 40° C.

In the preferred embodiment, the so formed catalyst system undergoes a pre-polymerization step in liquid propylene carried out in an agitated vessel, optionally in the presence of ethylene, forming amounts of polymer from about 0.1 g per gram of solid component up to about 1000 g per gram of solid catalyst component. The pre-polymerization step can be carried out at temperatures from 0 to 80° C., preferably from 5 to 50° C. especially from 10 to 30° C. The so obtained pre-polymer is then fed to the loop reactor operating at a pressure ranging from 20 to 50 bar at a temperature ranging from 40 to 120° C. preferably from 50 to 90° C. The said polymerization temperatures are also used in the case when the section of catalyst pre-contact and/or pre-polymerization is not present. Ethylene is added in the main polymerization step as a gas in an amount sufficient to reach the desired content in the polymer. The skilled in the art knowing the usual monomer reactivity parameters associated with the Z/N catalysts can easily determine the suitable amount of ethylene to be introduced. Similarly, the molecular weight of the propylene polymer composition is regulated by using known regulators, such as hydrogen. Optionally, antistatic agents such as those disclosed in EP560035 can be used in order to minimize clogging problems.

The applicant has also found that modifying the slurry density of the loop reactor can have an effect on the easy operability of the process. In particular, operating at slurry density of lower than 550 kg/m³ (referring to Kg of polymer per m³ of liquid medium), preferably lower than 530 and more preferably lower than 510 kg/m³ may be advisable especially when the ethylene content of the copolymer is considerably high.

The following examples are given to illustrate and not to limit the present invention.

EXAMPLES

The data of the propylene polymer materials were obtained according to the following methods:

Comonomer (C2) Content
 By IR spectroscopy.
Melt Flow Rate (MFR)
 Determined according to ISO 1133 (230° C., 2.16 Kg)
Molecular Weights and MWD for the Whole Polymer
 Molecular weights and molecular weight distribution were measured at 145° C. using a Alliance GPCV 2000 instrument (Waters) equipped with three mixed-bed columns TosoHaas TSK GMHXL-HT having a particle size of 13 µm. The dimensions of the columns were 300×7.8 mm. The mobile phase used was vacuum distilled 1,2,4-Trichlorobenzene (TCB) and the flow rate was kept at 1.0 ml/min. The sample solution was prepared by heating the sample under stirring at 145° C. in TCB for two hours. The concentration was 1 mg/ml. To prevent degradation, 0.1 g/l of 2,6-diterbutyl-p-cresol were added. 326.5 µL of solution were injected into the column set. A calibration curve was obtained using 10 polystyrene standard samples (EasiCal kit by Polymer Laboratories) with molecular weights in the range from 580 to 7500000; additionally two other standards with peak molecular weight of 11600000 and 13200000 from the same manufacturer were included. It was assumed that the K values of the Mark-Houwink relationship were:

$K=1.21\times10^{-4}$ dL/g and $\alpha=0.706$ for the polystyrene standards
$K=2.01-2.03\times10^{-4}$ dL/g and $\alpha=0.725$ for the samples A third order polynomial fit was used for interpolate the experimental data and obtain the calibration curve. Data acquisition and processing was done by using Millenium 4.00 with GPC option by Waters.

Intrinsic Viscosity
 Determined in tetrahydronaphthalene at 135° C.
Flexural Modulus
 Determined according to ISO 178
Stress at Yield and at Break
 Determined according to ISO 527
Elongation at Yield and Break
 Determined according to ISO 527
IZOD Impact Strength
 Determined according to ISO 180/1A
Ductile/Brittle Transition Temperature (D/B)
 According to this method, the bi-axial impact resistance is determined through impact with an automatic, computerized striking hammer.

The circular test specimens are obtained by cutting with circular hand punch (38 mm diameter). They are conditioned for at least 12 hours at 23° C. and 50 RH and then placed in a thermostatic bath at testing temperature for 1 hour. The force-time curve is detected during impact of a striking hammer (5.3 kg, hemispheric punch with a ½" diameter) on a circular specimen resting on a ring support. The machine used is a CEAST 6758/000 type model no. 2.

D/B transition temperature is the temperature at which 50% of the samples undergoes fragile break when submitted to the above-mentioned impact test.

The plaques for D/B measurements, having dimensions of 127×127×1.5 mm are prepared according to the following method.

The injection press is a Negri Bossi™ type (NB 90) with a clamping force of 90 tons.

The mould is a rectangular plaque (127×127×1.5 mm).

The main process parameters are reported below:

| | |
|---|---|
| Back pressure (bar): | 20 |
| Injection time (s): | 3 |
| Maximum Injection pressure (MPa): | 14 |
| Hydraulic injection pressure (MPa): | 6-3 |
| First holding hydraulic pressure (MPa): | 4 ± 2 |
| First holding time (s): | 3 |
| Second holding hydraulic pressure (MPa): | 3 ± 2 |
| Second holding time (s): | 7 |
| Cooling time (s): | 20 |
| Mould temperature (° C.): | 60 |

The melt temperature is between 220 and 280° C.

Haze (on 1 mm Plaque)

According to the present method, 5×5 cm specimens are cut molded plaques of 1 mm thick and the haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method. 75×75×1 mm plaques are molded with a GBF Plastiniector G235/90 Injection Molding Machine, 90 tons under the following processing conditions:

| | |
|---|---|
| Screw rotation speed: | 120 rpm |
| Back pressure: | 10 bar |
| Melt temperature: | 260° C. |
| Injection time: | 5 sec |
| Switch to hold pressure: | 50 bar |
| First stage hold pressure: | 30 bar |
| Second stage pressure: | 20 bar |
| Hold pressure profile: | First stage 5 sec |
| | Second stage 10 sec |
| Cooling time: | 20 sec |
| Mold water temperature: | 40° C. |

Melting Temperature, Melting Enthalpy and Crystallization Temperature

Determined by DSC measurements using a differential scanning calorimeter Mettler. The instrument is calibrated with indium and tin standards. The weighted sample (5-10 mg), was sealed into aluminum pans, heated to 200° C. and kept at that temperature for a time long enough (5 minutes) to allow a complete melting of all the crystallites. Successively, after cooling at 20° C./min to −20° C. After standing 5 minutes at 0° C., the sample was heated to 200° C. at a rate of 20° C./min. In this second heating run, the peak temperature was assumed as melting temperature (Tm).

Determination of 2-1 Regioinversion 2.1 regioinversion were determined by means of $C^{13}$-NMR spectra according to the methodology described by J. C. Randall in "Polymer sequence determination Carbon 13 NMR method", Academic Press 1977. The content of regio-invertions is calculated on the basis of the relative concentration of $S_{\alpha\beta}+S_{\beta\beta}$ methylene sequences. $^{13}$C-NMR spectra were acquired on a DPX-400 spectrometer operating at 100.61 MHz in the Fourier transform mode at 120° C. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove $^1$H-$^{13}$C coupling. About 3000 transients were stored in 32K data points using a spectral window of 6000 Hz.

Oligomer Content

The sample was dissolved in o-xylene at the reflux temperature for 30 min. After that the solution was cooled and maintained at 25 degC for one hour. The solution was then filtered and the filtered solution was evaporated to obtain the xylene soluble fraction.

Molecular weight distribution of the xylene soluble fraction was measured by the following conditions.
Apparatus: Waters 150 C Plus
Column: one SHODEX HT-G and two SHODEX HT-806M
Mobile phase: 1,2,4-trichlorobenzene with 0.1 w/v % of BHT
Sample concentration: 1 mg/ml
Temperature: 140 degC
Flow rate: 1.0 mL/min.

A calibration curve was obtained by using polystyrene standard samples (SHODEX by Showa Denko). Molecular weight obtained as polystyrene by the universal calibration curve was converted to the molecular weight of the samples by the following equation.

$M_{PP}=0.476 M_{PS}^{1.023}$ where, $M_{PP}$ and $M_{PS}$ were molecular weight of the sample and the polystyrene, respectively having the same retention time.

The oligomer content of the sample was defined by the following equation.

Oligomer content (wt %)=XS (wt %)×W(%)/100 where, XS is a percentage of xylene soluble fraction and W is a percentage of the area of GPC curve, whose molecular weight is less than 1000 (FIG. 1).

Examples 1-4

The solid catalyst used in the following examples was prepared according to the Example 1 of the European Patent Application EP728769. Triethylaluminium (TEA1) was used as co-catalyst and dicyclopentyldimethoxysilane as external donor, with the weight ratios indicated in Table 1.

The polymerization has been carried out in loop reactor under the conditions reported in Table 1 which the ethylene feeding was changed in order to obtain the copolymers reported in said Table.

The catalyst system in the form of catalyst mud obtained as described above is fed in the precontact vessel in which it is diluted with about 5 (Kg/h) of propane. From the pre-contact vessel the catalyst system is fed to the prepolymerization loop in which propylene is fed at a temperature of 20° C. The residence time of the catalyst in the loop is about 5 minutes. The prepolymerized catalyst obtained in the prepolymerization loop is then continuously feed into the loop reactor working under the conditions reported in Table 1. After the reported polymerization time the polymer obtained is discharged from the reactor, separated from the unreacted monomer and dried. The so obtained polymer was then pelletized and subject to mechanical measurements the result of which are reported in Table 1.

Comparison Example 1

A polymer sample available on the market having the same ethylene content as the polymers of the invention was characterized. The results are shown in Table 1.

TABLE 1

| EXAMPLES | | 1 | 2 | 3 | 4 | Comp.1 |
|---|---|---|---|---|---|---|
| PRE-CONTACT | | | | | | |
| TEA/Donor | g/g | 5 | 5 | 4 | 4 | |
| TEA/C3⁻ | g/g | 0.2 | 0.2 | 0.2 | 0.2 | |
| T | ° C. | 15 | 15 | 15 | 15 | |
| POLYMERIZATION | | | | | | |
| C2/C3 | Kg/Kg | 0.025 | 0.028 | 0.028 | 0.032 | |
| T° | ° C. | 68 | 68 | 68 | 68 | |
| Time | min | 67 | 71 | 67 | 69 | |
| Slurry density | | 500 | 500 | 500 | 500 | |
| H₂ fed | Mol-ppm | 105 | 530 | 105 | 100 | |
| POLYMER CHARACTERIZATION | | | | | | |
| MFR | g/10' | 0.4 | 2.2 | 0.2 | 0.2 | 0.1 |
| C2 | Wt % | 4.8 | 5.1 | 5 | 6 | 6 |
| Mw/Mn | | 4.5 | 5.1 | 4.8 | 4.8 | 4.7 |

TABLE 1-continued

| EXAMPLES | | 1 | 2 | 3 | 4 | Comp.1 |
|---|---|---|---|---|---|---|
| Mz/Mw | | 3.4 | 3.3 | 3.1 | 3 | 4.9 |
| 2-1 regio-inversion | | — | — | — | — | — |
| X.S. | Wt % | 8.3 | 10.1 | 10.5 | 12.4 | 11.8 |
| Tm | °C. | 129.7 | 130.9 | 128.5 | 127.1 | 128.7 |
| Flex. Mod. | Mpa | 670 | 620 | 635 | 540 | 610 |
| IZOD 23° C. | KJ/m² | — | 71 | 81 | 79 | 78 |
| DB T/T | °C. | — | −3 | −2 | −6.7 | −6.5 |
| HAZE (1 mm plaque) | % | 34 | 29 | 28.3 | 23.7 | 24.7 |

Examples 5 and Comparison Example 2

The polymer produced in example 4 was visbroken with peroxides up to melt index 6.9 and characterized obtaining the following results. The polymer of comparison example 2 was obtained by visbreaking the polymer of comparison example 1.

TABLE 2

| | | Ex. 5 | Comp. 2 |
|---|---|---|---|
| MFR | g/10' | 6.9 | 5.1 |
| Flex. Mod. | Mpa | 456 | 455 |
| IZOD 23° C. | KJ/m² | 10.9 | 12.1 |
| DB T/T | °C. | −16 | −14 |
| SIT | °C. | 108 | 113 |
| HAZE (1 mm plaque) | % | 37.7 | 53.5 |

Examples 6-8 and Comparison Example 3

The polymers produced in examples 1, 2 and 4 and the polymer of comparison example 1 were additivated with the formulation described below and characterized obtaining the results shown in the following Table 3.

TABLE 3

| EXAMPLE | | 6 | 7 | 8 | Comp. 3 |
|---|---|---|---|---|---|
| Polymer from example | | 1 | 2 | 4 | |
| Pellets formulation | | | | | |
| Irganox B225 | wt % | 0.15 | 0.15 | 0.15 | |
| Calcium Stearate | wt % | 0.05 | 0.05 | 0.05 | |
| Gellal E200 | wt % | 0.2 | 0.2 | 0.2 | |
| Characterization | | | | | |
| Flexural modulus | MPa | 753 | 690 | 540 | 621 |
| IZOD 23° C. | kJ/m² | 64.5 | 35 | 78 | 82 |
| D/B transition temperature | °C. | 2 | 1.8 | −7.3 | −5 |
| Haze (on 1 mm plaque) | % | 12.9 | 9 | 12 | 18 |

Example 9 and Comparison Example 4

The nucleated polymer produced in example 8 and that of comparison example 3 were visbroken with peroxide up to melt index of 20 and 27 respectively and then characterized obtaining the following results:

TABLE 4

| Example | | 9 | Comp. 4 |
|---|---|---|---|
| MFR | g/10' | 20 | 27 |
| Flex. Mod. | Mpa | 540 | 530 |
| IZOD 23° C. | KJ/m² | 12 | 10.5 |
| HAZE (1 mm plaque) | % | 18 | 28.7 |

Examples 10, 11 and Comparison Example 5

The polymerization conditions and the structures of the sample were shown in the table below. The catalyst system used in this experiment was same as that of the example 1-4.
Precontact
The solid catalyst was contacted with TEAL and the external donor in hexane for 5 min at room temperature.
Prepolymerization
The catalyst, liquid propylene and hydrogen were fed into a 6 L autoclave and the temperature was elevated up to 70 degC over 10 min.
Polymerization
After that, ethylene was continuously fed into the autoclave during polymerization and the partial pressure of ethylene was kept constant. After the reported polymerization time, the unreacted monomer was discharged and the obtained polymer was dried.

TABLE 5

| PRECONTACT | | |
|---|---|---|
| TEA/Donor | g/g | 10 |
| TEA/C6(hexane) | g/g | 0.014 |
| T | °C. | RT |
| POLYMERIZATION | | |
| C2 partial pressure | MPa | 0.15 |
| T | °C. | 70 |
| Time | min. | 60 |
| Slurry density (final) | Kg/L | 472 |
| H2 fed (vs propylene) | Mol-ppm | 250 |
| POLYMER CHARACTERIZATION | | |
| MFR | g/10' | 0.15 |
| C2 | Wt % | 5.7 |
| Mw/Mn | | 5.2 |
| Mz/Mw | | 2.9 |
| X.S. | Wt % | 10.7 |

The polymer was visbroken with peroxides up to melt index 2.1 and 12.3 and measured the oligomer content of the samples. The polymer of comparison example 5 was obtained by visbreaking the polymer of comparison example 1.

TABLE 6

| EXAMPLE | | 10 | 11 | Comp. 5 |
|---|---|---|---|---|
| MFR | g/10' | 2.1 | 12.3 | 5.1 |
| C2 | Wt % | 5.7 | 5.7 | 6 |
| Oligomer content | Wt % | 0.26 | 0.31 | 0.44 |

The invention claimed is:
1. Propylene/ethylene copolymers comprising:
an ethylene content in the range of 5 to 6.5% wt;
a Mw/Mn (via GPC) in the range 3.5-5.5;
a Mz/Mw (via GPC) lower than 4;
a melt flow rate of 0.1 to 2 g/10';
an absence of 2-1 regioinversion; and a Melting Temperature (Tm) (non-nucleated grade) lower than 143° C., produced in a polymerization process comprising a slurry of liquid propylene as a polymerization medium having a slurry density, and in the presence of a catalyst system comprising a solid catalyst component comprising at least one titanium compound having at least one titanium-halogen bond and at least an electron-donor compound (internal donor), both supported on a magnesium chloride compound, said electron donor compound being selected from 1,3-diethers of formula (I),

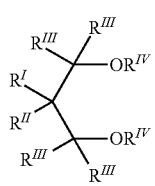

(I)

where $R^I$ and $R^{II}$ are the same or different and are hydrogen or linear or branched $C_1$-$C_{18}$ hydrocarbon groups which can also form at least one cyclic structure; $R^{III}$ groups, equal or different from each other, are hydrogen or $C_1$-$C_{18}$ hydrocarbon groups; $R^{IV}$ groups equal or different from each other, are $C_1$-$C_{18}$ hydrocarbon groups; and each of $R^I$ to $R^{IV}$ groups can contain heteroatoms selected from halogens, N, O, S and Si.

2. The propylene/ethylene copolymers according to claim 1 in which the Mw/Mn ranges from 3.5 to 5.3.

3. The propylene/ethylene copolymers according to claim 1 in which the Mz/Mw value is lower than 3.8.

4. The propylene/ethylene copolymers according to claim 1 further comprising an intrinsic viscosity [η] in tetraline at 135° C. higher than 1.5.

5. A process comprising preparing propylene/ethylene copolymers in a slurry of liquid propylene as a polymerization medium having a slurry density, and in the presence of a catalyst system comprising a solid catalyst component comprising at least one titanium compound having at least one titanium-halogen bond and at least an electron-donor compound (internal donor), both supported on a magnesium chloride compound, said electron donor compound being selected from 1,3-diethers of formula (I),

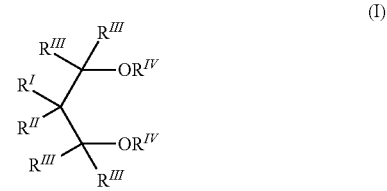

(I)

where $R^I$ and $R^{II}$ are the same or different and are hydrogen or linear or branched $C_1$-$C_{18}$ hydrocarbon groups which can also form at least one cyclic structure; $R^{III}$ groups, equal or different from each other, are hydrogen or $C_1$-$C_{18}$ hydrocarbon groups; $R^{IV}$ groups equal or different from each other, are $C_1$-$C_{18}$ hydrocarbon groups; and each of $R^I$ to $R^{IV}$ groups can contain heteroatoms selected from halogens, N, O, S and Si, the copolymers comprising:
   an ethylene content in the range of 5 to 6.5% wt;
   a Mw/Mn (via GPC) in the range 3.5-5.5;
   a Mz/Mw (via GPC) lower than 4;
   an absence of 2-1 regioinversion; and
   a Melting Temperature (Tm) (non-nucleated grade) lower than 143° C.

6. The process according to claim 5 in which the slurry density is lower than 550 kg/m³.

7. The propylene/ethylene copolymers according to claim 1 wherein the ethylene content ranges from 5 to 6%.

8. The propylene/ethylene copolymers of claim 1 wherein the Melting Temperature (Tm) (non-nucleated grade) is 125 to 135° C.

9. The propylene/ethylene copolymers of claim 1 further comprising:
   an oligomer content less than 0.4%.

10. The propylene/ethylene copolymers according to claim 3 in which the Mz/Mw value is lower than 3.5.

* * * * *